(12) United States Patent
Krishnan et al.

(10) Patent No.: US 8,605,806 B2
(45) Date of Patent: Dec. 10, 2013

(54) SCHEMES FOR DETECTING GUARD INTERVALS IN OFDM SYSTEM

(75) Inventors: S. Harish Krishnan, Bangalore (IN); Shrinivas Bhat, Bangalore (IN)

(73) Assignee: Saankhya Labs Pvt. Ltd., Bangalore (IN)

( * ) Notice: Subject to any disclaimer, the term of this patent is extended or adjusted under 35 U.S.C. 154(b) by 0 days.

(21) Appl. No.: 13/436,090

(22) Filed: Mar. 30, 2012

(65) Prior Publication Data

US 2012/0250807 A1 Oct. 4, 2012

(30) Foreign Application Priority Data

Mar. 31, 2011 (IN) ........................ 1094/CHE/2011

(51) Int. Cl.
*H04K 1/10* (2006.01)
(52) U.S. Cl.
USPC ............ 375/260; 370/203; 370/208; 370/464
(58) Field of Classification Search
None
See application file for complete search history.

(56) References Cited

U.S. PATENT DOCUMENTS

| 6,714,511 | B1 * | 3/2004 | Sudo et al. ..................... 370/208 |
| 7,319,659 | B2 | 1/2008 | Tsuie |
| 7,590,193 | B2 | 9/2009 | Han |
| 2003/0123530 | A1 * | 7/2003 | Maeda et al. ................. 375/148 |
| 2003/0142764 | A1 * | 7/2003 | Keevill et al. ................. 375/341 |

FOREIGN PATENT DOCUMENTS

EP 1193934 B1 8/2009

\* cited by examiner

*Primary Examiner* — Adolf Dsouza
(74) *Attorney, Agent, or Firm* — Rahman LLC

(57) ABSTRACT

A receiver and method of detecting a guard interval estimate accurately by performing an Nth order polynomial based non-linear quantization on a pre-estimated guard interval in a received Orthogonal Frequency Division Multiplexing (OFDM) signal in a receiver is provided. The pre-estimated guard interval is obtained by performing normalized auto-correlation on the received OFDM signal. The method includes (i) performing a rounding operation on (a) one or more $m^{th}$ coefficient of the polynomial and (b) the pre-estimated guard interval to obtain an indexing parameter 'k', and detecting the guard interval estimate based on (i) a value of k, and (ii) a guard interval from one or more guard intervals that are stored in a look up table. The guard interval estimate is detected in accordance with an equation: $\tilde{L}=L[k-4]$, where 'L' is the guard interval stored in the look up table that corresponds to the value of k.

11 Claims, 10 Drawing Sheets

SCHEMES FOR DETECTING GUARD INTERVALS IN OFDM SYSTEM

CROSS-REFERENCE TO RELATED APPLICATIONS

This application claims priority to Indian patent application no. 1094/CHE/2011 filed on Mar. 31, 2011, the complete disclosure of which, in its entirety, is herein incorporated by reference.

BACKGROUND

1. Technical Field

The embodiments generally relate to a guard interval length detection in an orthogonal frequency division multiplexing (OFDM) based system, and, more particularly, to non-linear quantization methods for detecting the guard interval lengths in OFDM systems.

2. Description of the Related Art

An orthogonal frequency division multiplexing (OFDM) method is known as a radio transmission method which has excellent anti-multi-path characteristic. Typically, in OFDM systems, the effect of the inter symbol interference is reduced by inserting guard intervals between OFDM symbols. Cyclic prefix, which is transmitted during the guard interval (GI), refers to prefixing of the symbol with the repetition of the end portion of the OFDM symbol.

The transmitter chooses the guard interval length based on the maximum delay spread. The majority of OFDM systems that are currently deployed have guard interval lengths specified as fractions of an OFDM symbol, where the fractions are typically negative powers of two.

The receivers use the auto-correlative properties of an OFDM symbol which are good due to a presence of a cyclic prefix to estimate the symbol and guard interval length. These estimations use the linear quantization on guard interval estimates to detect the guard interval lengths. However, the presence of echoes and lower signal to noise ratio (SNR) can yield ambiguous guard interval length estimates. Samples in the guard intervals are generally dropped in the receivers after synchronization is achieved and the Fast Fourier Transform (FFT) of the remaining samples in the OFDM symbol is subjected to channel equalization and decoding. Due to incorrect GI detection, the receiver may end up dropping the wrong samples and taking the FFT at the wrong boundary resulting in errors in the reception.

During auto-correlation, time indexes (in terms of samples) of the auto-correlation values crossing a predefined threshold are obtained. The time interval between two such threshold crossover points is an indicator of a sum of symbol length (termed as MODE) and the guard interval (GI) length. Residual length after subtracting the MODE would give an estimate of the guard interval length. Because of different echo profiles and lower SNR's obtained, the guard interval estimate may lie between two possible guard interval lengths. This would lead to ambiguity in the detection of guard interval lengths. Simple linear quantization of the guard interval estimate would lead to incorrect guard interval detection since possible guard interval lengths follow a non-linear pattern (typically powers of two).

Traditionally, a transmitter sends the information on the guard interval using the additional signaling mechanisms, for example, Transmission Parameter Signalling (TPS) signaling for DVB-T systems. The correlation is done on every symbol with FFT being taken at the correlation boundary until the TPS signals is acquired and TPS decoding is performed to extract the guard interval. This would result in increased acquisition time for the DVB-T systems.

SUMMARY

In view of the foregoing, an embodiment herein provides a wireless receiver to detect a guard interval estimate accurately even in the presence of echoes and a lower SNR by performing a method of a Nth order polynomial based non-linear quantization on a pre-estimated guard interval in a received Orthogonal Frequency Division Multiplexing (OFDM) signal. The pre-estimated guard interval is obtained by performing normalized auto-correlation on the received OFDM signal. The pre-estimated guard interval includes one or more $m^{th}$ coefficient of the polynomial. The wireless receiver includes a Guard Interval (GI) detector circuit that (i) performs a rounding operation on (a) the one or more $m^{th}$ coefficient of the polynomial and (b) the pre-estimated guard interval to obtain an indexing parameter 'k' that is calculated in accordance with an equation: $k=RND(P(n)\hat{L}^n+P(n-1)\hat{L}^{n-1} \ldots P(0))$, and (ii) detects the guard interval estimate based on (i) a value of k, and (ii) a guard interval of a plurality of guard intervals stored in a look up table. The guard interval length is detected in accordance with an equation: $\hat{L}=L[k-4]$, where 'L' is the guard interval stored in the look up table that corresponds to the value of the k. The value of 'k' ranges from 5 to 11.

The one or more guard intervals range from 64, 128, 256, 512, 1024, to 2048. The guard interval estimate is detected by obtaining a Logarithm 2 ($\log_2$) of the one or more guard intervals and the pre-estimated guard interval obtained from the normalized auto-correlation. The guard interval estimate is detected by performing linear quantization of the $\log_2$ of the one or more guard intervals and the pre-estimated guard interval obtained from the normalized auto-correlation.

In another aspect, a wireless receiver to detect a guard interval estimate accurately even in the presence of echoes and a lower SNR by performing a method of a Geometric Mean (GM) based non-linear quantization on a pre-estimated guard interval in a received Orthogonal Frequency Division Multiplexing (OFDM) signal is provided. The pre-estimated guard interval is obtained by performing normalized auto-correlation on the received OFDM signal. The wireless receiver includes a Guard Interval (GI) detector circuit that includes a Guard Interval (GI) selection module that selects a first guard interval, and a second guard interval from a plurality of guard intervals stored in a look up table such that the pre-estimated guard interval lies between the first guard interval, and the second guard interval, a first multiplier that multiplies the first guard interval, and the second guard interval to obtain a quantization threshold guard interval, a second multiplier that performs a squaring operation on the pre-estimated guard interval to obtain a square value of the pre-estimated guard interval, a comparator that receives the quantization threshold guard interval and the square value of the pre-estimated guard interval and determines whether the quantization threshold guard interval is greater than the square value of said pre-estimated guard interval, and a multiplexer that detects the first guard interval to correspond to the guard interval estimate when the squared value of the pre-estimated guard interval is greater than the quantization threshold guard interval.

The guard interval estimate is non-linearly quantized when the squared value of the pre-estimated guard interval is compared with a Geometric Mean (GM) of the first guard interval, and the second guard interval. The multiplexer detects the second guard interval to correspond to the guard interval estimate when the square value of the pre-estimated guard interval is less than the quantization threshold guard interval. The quantization of the guard interval estimate is determined in accordance with an equation: $\hat{L} \geq \sqrt{L(n)L(n+1)}$, where (n) and (n+1) are adjacent indexes between which the pre-estimated guard interval lies, where $\hat{L}$ is the pre-estimated guard interval, where $(\sqrt{L(n)L(n+1)})$ is the Geometric Mean (GM) of the first guard interval, and the second guard interval.

A value of the 'n' ranges from 1 to 5. An indexing parameter '[k]' equals (n+1) when $\hat{L}$ is greater than or equal to the Geometric Mean (GM) of the first guard interval, and the second guard interval. The indexing parameter '[k]' equals (n) when $\hat{L}$ is less than the Geometric Mean (GM) of the first guard interval, and the second guard interval. The guard interval estimate is determined in accordance with an equation: $\tilde{L}=L[k]$, where a value of the 'k' ranges from 1 to 6. 'L' is the first guard interval or the second guard interval from the one or more plurality of guard intervals stored in the look up table.

In yet another aspect, a method of detecting a guard interval estimate accurately even in the presence of echoes and a lower SNR by performing a Nth order polynomial based non-linear quantization on a pre-estimated guard interval in a received Orthogonal Frequency Division Multiplexing (OFDM) signal in a receiver is provided. The pre-estimated guard interval is obtained by performing normalized auto-correlation on the received OFDM signal. The pre-estimated guard interval includes one or more 'mth' coefficient of the polynomial. The method includes (i) performing a rounding operation on (a) one or more $m^{th}$ coefficient of the polynomial and (b) the pre-estimated guard interval to obtain an indexing parameter 'k' that is calculated in accordance with an equation: $k=RND(P(n)\hat{L}^n+P(n-1)\hat{L}^{n-1} \ldots P(0))$, and detecting the guard interval estimate based on (i) a value of k, and (ii) a guard interval from one or more guard intervals that are stored in a look up table. The guard interval estimate is detected in accordance with an equation: $\tilde{L}=L[k-4]$, where 'L' is the guard interval stored in the look up table that corresponds to the value of k.

In yet a further aspect, a method of detecting a guard interval estimate accurately even in the presence of echoes and a lower SNR by performing a Geometric Mean (GM) based non-linear quantization on a pre-estimated guard interval in a received Orthogonal Frequency Division Multiplexing (OFDM) signal in a receiver is provided. The pre-estimated guard interval is obtained by performing normalized auto-correlation on the received OFDM signal. The method includes (i) selecting (a) a first guard interval, and (b) a second guard interval from a plurality of guard intervals stored in a look up table such that the pre-estimated guard interval lies between the first guard interval, and the second guard interval, (ii) multiplying the first guard interval, and the second guard interval to obtain a quantization threshold guard interval, (iii) performing a squaring operation on the pre-estimated guard interval to obtain a square value of the pre-estimated guard interval, and detecting whether the guard interval estimate corresponds to the first guard interval or the second guard interval.

The guard interval estimate corresponds to the first guard interval when the square value of the pre-estimated guard interval is greater than the quantization threshold guard interval. The guard interval estimate corresponds to the second guard interval when the square value of the pre-estimated guard interval is less than the quantization threshold guard interval. The guard interval estimate is non-linearly quantized when the squared value of the pre-estimated guard interval is compared with a Geometric Mean (GM) of the first guard interval, and the second guard interval.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
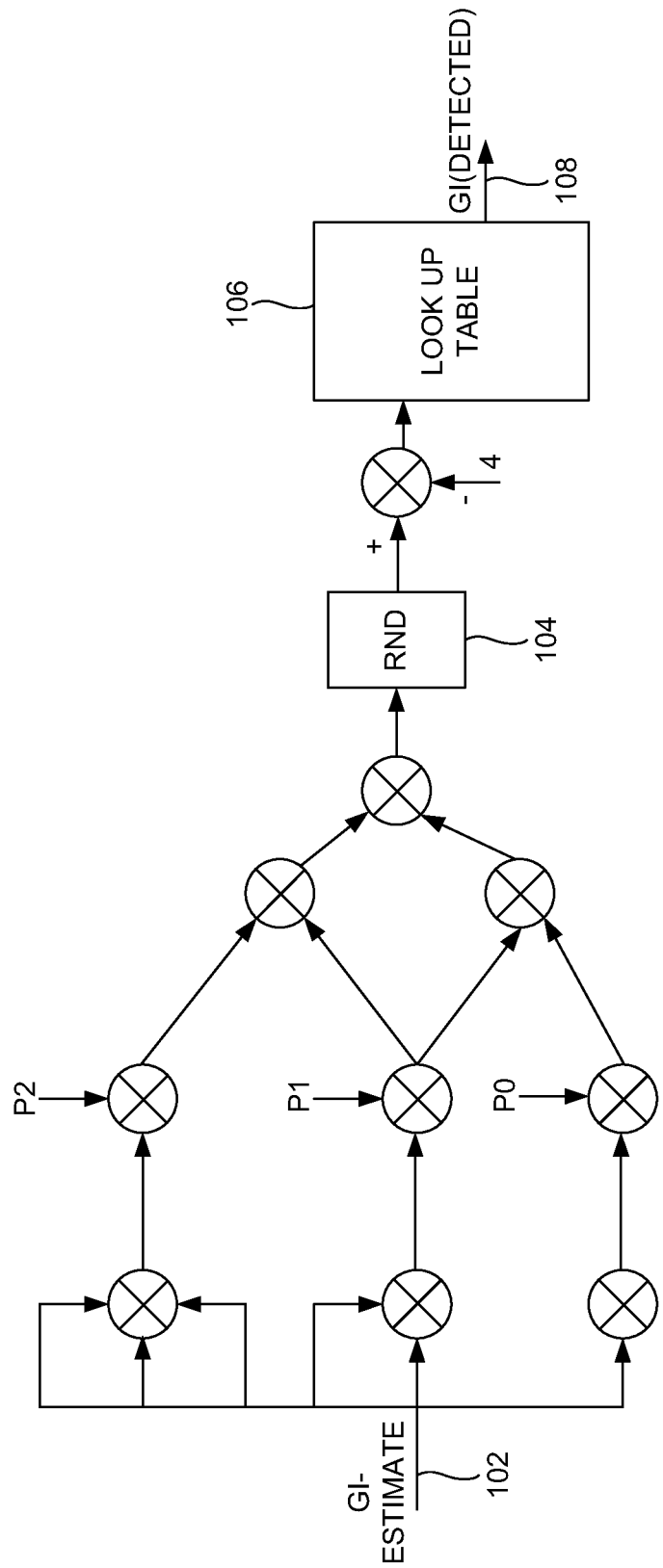
FIG. 1 is a Guard Interval (GI) circuit for detecting an accurate guard interval using a $3^{rd}$ order polynomial based non-linear quantization according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for guard interval detection even in the presence of echoes and lower SNR. The embodiments herein achieve this by providing a guard interval detector that detects accurate guard interval estimate by performing a geometric mean based non-linear quantization method and/or a higher order polynomial based non-linear quantization method on the received OFDM signal in a receiver based on a pre-estimated guard interval that is obtained by performing normalized auto-correlation on the received OFDM signal. Referring now to the drawings, and more particularly to FIGS. 1 through 9, where similar reference characters denote corresponding features consistently throughout the figures, there are shown preferred embodiments.

FIG. 1 is a Guard Interval (GI) circuit for detecting an accurate guard interval using a $3^{rd}$ order polynomial based non-linear quantization in a receiver according to an embodiment herein. A pre-estimated Guard Interval (GI) 102 is obtained by performing normalized auto-correlation on the received OFDM signal. The pre-estimated GI is subjected to the $3^{rd}$ order polynomial fit. The pre-estimated GI 102 includes one or more 'mth' coefficients of the polynomial. The Guard Interval (GI) circuit performs a rounding operation (e.g., using a RND block 104 of FIG. 1) on the one or more 'mth' coefficient of the polynomial and the pre-estimated guard interval to obtain an indexing parameter 'k', where a value of 'k' is calculated in accordance with an equation:

$$k=RND(P(n)\hat{L}^n+P(n-1)\hat{L}^{n-1}\ldots P(0)).$$

The GI circuit detects the guard interval estimate based on (i) a value of the k and (ii) a guard interval from a plurality of guard intervals stored in a look up table (e.g., a look up table 106 of FIG. 1). The GI length (e.g., the GI 108 of FIG. 1) is detected in accordance with an equation:

$$\tilde{L}=L[k-4],$$

where 'L' is the guard interval stored in the look up table that corresponds to the value of k. In one embodiment, after performing the rounding operation, the resulting output from polynomial fit is used as an address to point into a lookup table 104 containing all the GI possibilities. Based on the GI possibilities from the look up table 104 the accurate value of the guard interval length 106 is detected.

The value of 'k' ranges from 5 to 11. The guard intervals range from 64, 128, 256, 512, 1024, to 2048. In one embodiment, the guard interval estimate is detected by obtaining a Logarithm 2 ($\log_2$) of (i) the one or more guard intervals and/or (ii) the pre-estimated guard interval obtained from the normalized auto-correlation. In another embodiment, the guard interval estimate is detected by performing linear quantization of the $\log_2$ of (i) the one or more guard intervals and/or (ii) the pre-estimated guard interval obtained from the normalized auto-correlation.

Figure 2:
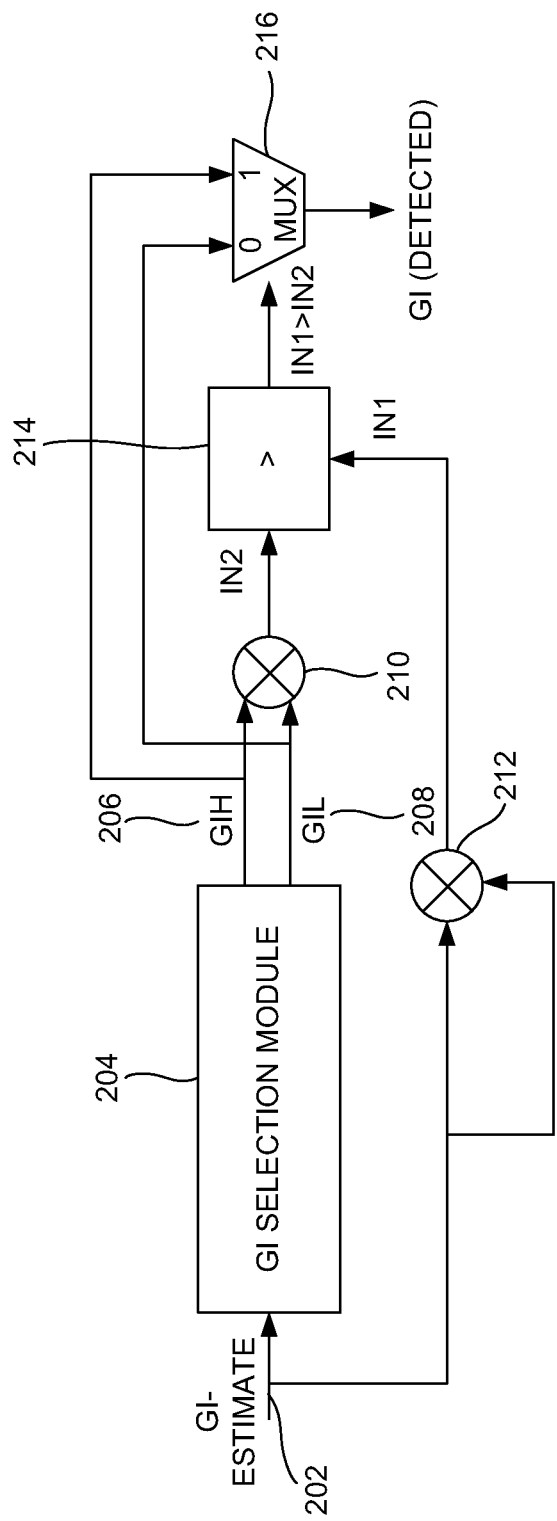
FIG. 2 illustrates a block diagram for a guard interval detection using a Geometric Mean (GM) based non-linear quantization according to an embodiment herein.

FIG. 2 illustrates a block diagram for a guard interval detection using a Geometric Mean (GM) based non-linear quantization according to an embodiment herein. In one embodiment, the GI is determined by performing a method of a Geometric Mean (GM) based non-linear quantization on the pre-estimated guard interval in a received Orthogonal Frequency Division Multiplexing (OFDM) signal. The block diagram includes a pre-estimated guard interval (GI) 202, a Guard Interval (GI) selection module 204, a higher GI (GIH) 206, a lower GI (GIL) 208, a first multiplier 210, a second multiplier 212, a comparator 214, and a multiplexer 216.

The GI selection module 204 selects a first guard interval (e.g., the GIH 206), and a second guard interval (e.g., the GIL 208) from a plurality of guard intervals stored in a look up table. In one embodiment, the Guard Interval (GI) selection module 204 selects the first guard interval and the second guard interval such that the pre-estimated guard interval lies between the first guard interval 206, and the second guard interval 208. The first multiplier 210 multiplies the first guard interval and the second guard interval to obtain a quantization threshold guard interval. The second multiplier 212 performs a squaring operation on the pre-estimated guard interval to obtain a square value of the pre-estimated guard interval.

The comparator 214 receives the quantization threshold guard interval and the square value of the pre-estimated guard interval. The comparator 214 determines whether the quantization threshold guard interval is greater than the square value of the pre-estimated guard interval. The multiplexer 216 detects the first guard interval (e.g., the GIH 206) as the guard interval estimate when the square value of the pre-estimated guard interval is greater than the quantization threshold guard interval. The guard interval estimate is non-linearly quantized when the square value of the pre-estimated guard interval is compared with a Geometric Mean (GM) of the first guard interval, and the second guard interval. The multiplexer 216 detects the second guard interval as the guard interval estimate when the square value of the pre-estimated guard interval is less than the quantization threshold guard interval.

The quantization of the guard interval estimate is determined in accordance with an equation:

$$\hat{L}\geq\sqrt{L(n)L(n+1)},$$

where (n) and (n+1) are adjacent indexes between which the pre-estimated guard interval lies. Where $\hat{L}$ is the pre-estimated guard interval, and $(\geq\sqrt{L(n)L(n+1)})$ is the Geometric Mean (GM) of the first guard interval, and the second guard interval. A value of 'n' ranges from 1 to 5. An indexing parameter '[k]' equals (n+1) when a value of $\hat{L}$ is greater than or equal to the Geometric Mean (GM) of the first guard interval, and the second guard interval. The indexing parameter '[k]' equals the (n) when the value of $\hat{L}$ is less than the Geometric Mean (GM) of the first guard interval, and the second guard interval.

The guard interval estimate is determined in accordance with an equation: $\tilde{L}=L[k]$, where a value of 'k' ranges from 1 to 6, the value of 'L' is the first guard interval or the second guard interval from the plurality of guard intervals stored in the look up table. The pre-estimated guard interval (GI) 202 is obtained from the autocorrelation approach lies between GIL (GI<GI-ESTIMATE) 210 and GIH (GI>GI-ESTIMATE) 212 and selects the GI possibilities through the GI selection module 212.

The geometric mean of the first guard interval (e.g., the GIH 206) and the second guard interval (e.g., the GIL 208) sets up the quantization threshold depicted as IN2. The square of the pre-estimated guard interval (GI) 202 is termed as IN1. The GIH 206 is the guard interval detected when the pre-estimated guard interval (GI) 202 is greater than the geometric mean of the first guard interval and the second guard interval (IN1>IN2). The GIL 208 is the guard interval detected when the pre-estimated guard interval (GI) 202 is less than the geometric mean (IN1<IN2).

Figure 3A:
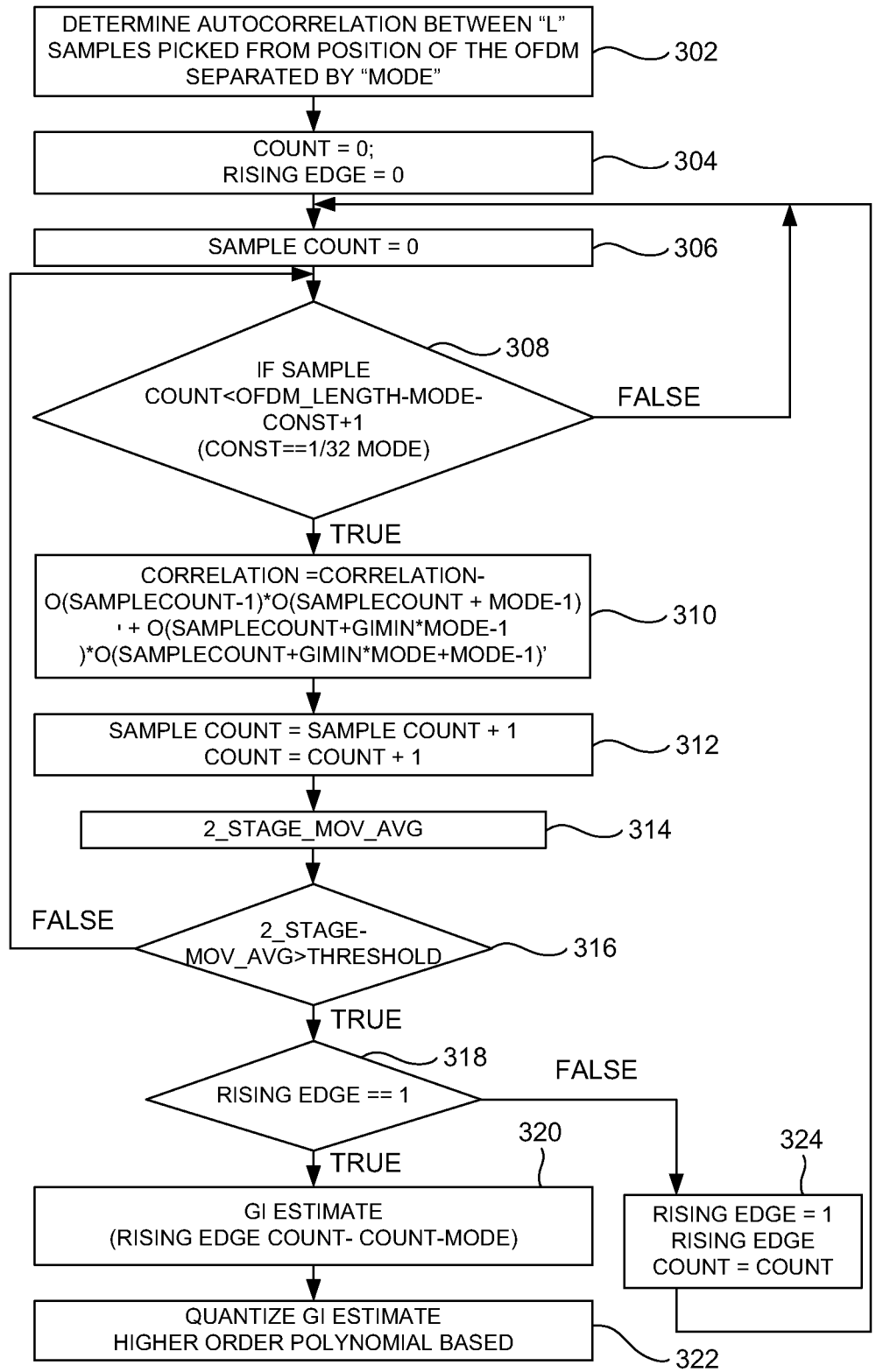
FIG. 3A is a flow chart illustrating a guard interval estimation using the non-linear quantization methods according to an embodiment herein.

FIG. 3A is a flow chart illustrating a guard interval estimation using the above non-linear quantization methods according to an embodiment herein. In step 302, the auto-correlation value is determined between 'L' samples picked from two portions of an OFDM symbol. In step 304, during an initialization process, a value of count and a number of rising edge is 0. The value of sample count is also 0 after initialization in step 306. In step 308, it is checked whether the sample count is less than a calculated value of OFDM_LENGTH−MODE−CONST+1. The value of CONST is 1 GIMIN*MODE. GIMIN is the minimum possible GI supported in the standard. If true (if the sample count is less than a calculated value of OFDM_LENGTH−MODE−CONST+1), then correlation of sample is calculated in step 310 in accordance with an equation:

Correlation=Correlation−$O$(SampleCount−1)*$O$(SampleCount+MODE−1)'+$O$(SampleCount+GIMIN*MODE−1)*$O$(SampleCount+GIMIN*MODE+MODE−1)'  (1)

where $O(X)$ indicates $X_{th}$ Sample.

Else, (if the sample count is greater than a calculated value of OFDM_LENGTH−MODE−CONST+1), the step 306 is repeated. In step 312, the sample count and the count are incremented by 1 (SampleCount=SampleCount+1, and Count=Count+1). In step 314, a two stage moving average on correlation is calculated. In step 316, it is checked whether the two stage moving average is greater than a threshold value. If true (if the two stage moving average is greater than a threshold value), it is checked whether the value of the rising edge equals 1 in step 318. Else, (if the two stage moving average is less than threshold value), the step 308 is repeated.

If the rising edge is 1, the GI can be estimated in step 320. Else, if the rising edge is not equal to 0, the rising edge equals to count in step 324, and then the step 306 is repeated. In one embodiment, the GI estimated in step 320 is the pre-estimated GI that is obtained by performing normalized auto-correlation on the received OFDM signal. In step 322, the guard interval length can be estimated using either (i) a $N^{th}$ order polynomial based non-linear quantization method or (ii) a Geometric Mean based non-linear quantization method as discussed in the FIGS. 1 and 2. If the rising edge is not 1, then the rising edge is assigned to 1, and the rising edge count is assigned to a value that is of count in step 324, and the step 306 is repeated. The in-depth observation of prescribed guard interval lengths for a Digital Video Broadcasting—Terrestrial (DVB-T) system shows that the guard interval (GI) values are non-linear in nature. Let $\hat{L}$ be the guard interval estimate obtained from the autocorrelation. $L \in$ [64, 128, 256, 512, 1024, 2048] are the guard interval possibilities.

In one embodiment, the pre-estimated GI is non-linearly quantized using the $N^{th}$ order polynomial as shown below equations 2 and 3.

$$k=RND(P(n)\hat{L}^n+P(n-1)\hat{L}^{n-1}\ldots P(0))  \quad (2)$$

where n is an order of the polynomial, P(m) is mth coefficient of the polynomial, where P(m) corresponds to P(n), P(n−1), and/or P(0). RND is a rounding operation, and $\hat{L}$ is the guard interval estimate obtained from the auto-correlation. The new guard interval length (GI) is estimated in accordance with an equation:

$$\tilde{L}=L[k-4]  \quad (3)$$

where 'L' is the guard interval stored in the look up table that corresponds to the value of k which is used to index in to the prescribed guard interval set as shown in equation 2.

In another embodiment, the pre-estimated GI is non-linearly quantized using the Geometric Mean. Assuming $\hat{L}$ is the guard interval estimate obtained from the auto-correlation. $L \in$ [64, 128, 256, 512, 1024, 2048] are the guard interval possibilities. Then the guard interval detected $\tilde{L}$ is given by below equation. Here the guard interval estimate $\hat{L}$ lies between L(n) and L(n+1).

The quantization of the guard interval estimate is determined in accordance with an equation:

$$\hat{L} \geq \sqrt{L(n)L(n+1)},  \quad (4)$$

where (n) and (n+1) are adjacent indexes between which the pre-estimated guard interval lies, where $\hat{L}$ is the pre-estimated guard interval, where $(\geq \sqrt{L(n)L(n+1)})$ is the Geometric Mean (GM) of the first guard interval, and the second guard interval. A value of the 'n' ranges from 1 to 5. An indexing parameter '[k]' equals (n+1) when $\hat{L}$ is greater than or equal to the Geometric Mean (GM) of the first guard interval, and the second guard interval. The indexing parameter '[k]' equals (n) when the $\hat{L}$ is less than the Geometric Mean (GM) of the first guard interval, and the second guard interval. The guard interval estimate is determined in accordance with an equation: $\tilde{L}=L[k]$, where the value of 'k' ranges from 1 to 6, where 'L' is the first guard interval or the second guard interval from the plurality of guard intervals stored in the look up table.

Figure 3B:
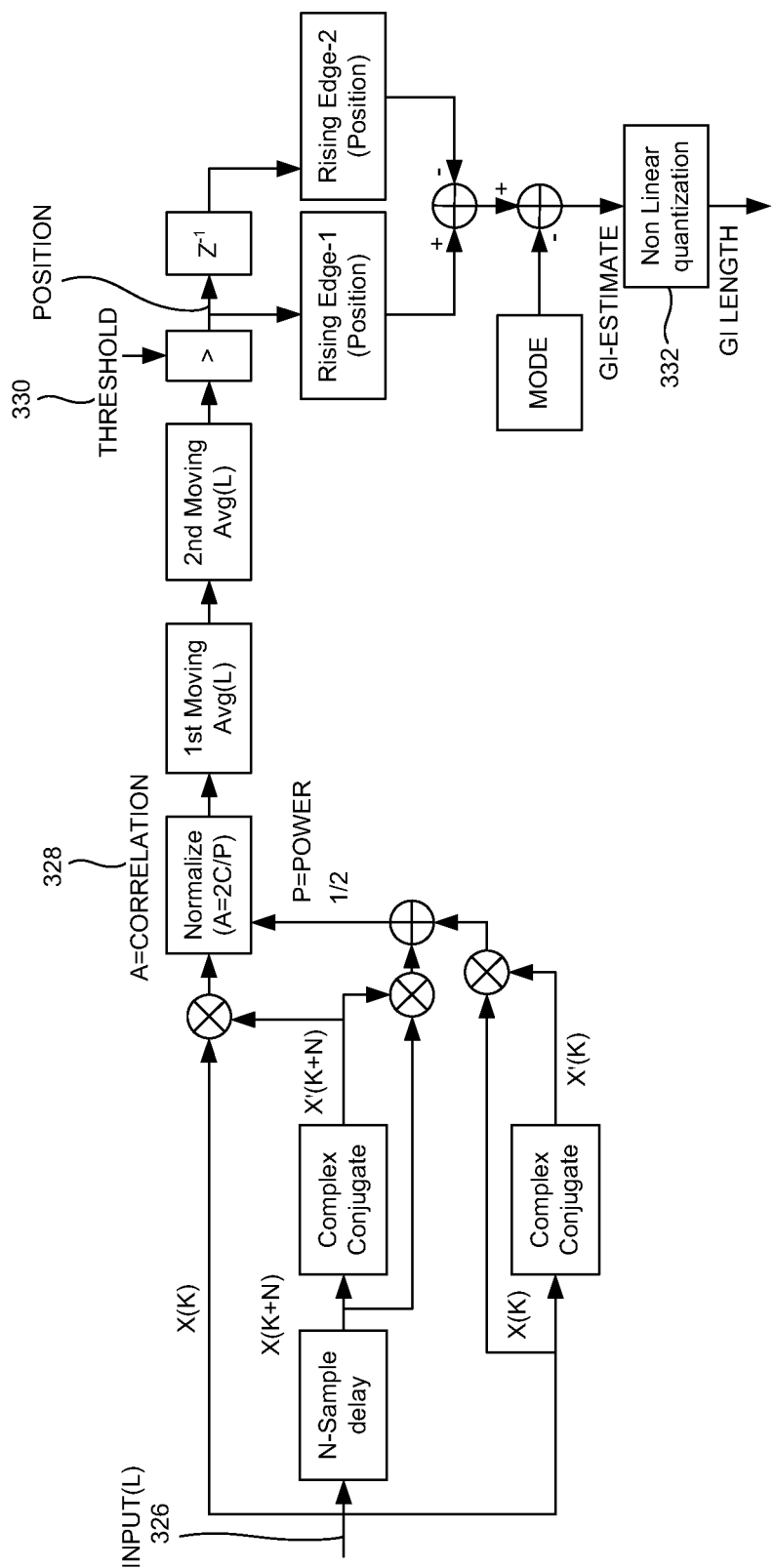
FIG. 3B illustrates block diagram of a GI estimation using the non-linear quantization methods according to an embodiment herein.

FIG. 3B illustrates block diagram of a GI estimation using the non-linear quantization methods according to an embodiment herein. The input signal 326 is subjected for autocorrelation. Time indexes (in terms of samples) of the auto-correlation values 328 crossing pre-defined thresholds 330 are obtained. Time interval between two such threshold cross-over points is an indicator of a sum of symbol length (termed as MODE) and the Guard interval (GI) length. An estimate of the Guard Interval length is obtained by subtracting the MODE from Residual length. Hence to detect the exact guard intervals from the obtained guard interval estimate, it is subjected to the nonlinear quantization 332.

Autocorrelation of the received signal X is performed in accordance with the equations:

$$C = \sum_{k=0}^{L-1} (X(K)*X'(K+N))  \quad (5)$$

$$P = \sum_{k=0}^{L-1} [(X(K)*X'(K) + X(K+N)*X'(K+N)]  \quad (6)$$

$$A = \frac{2C}{P},  \quad (7)$$

where L: Correlation window length, $$\left(L = \frac{N}{32}, N = 2K \text{ or } 8K\right)$$

$$N = \text{Mode of correlation}\left(\frac{2K}{8K}\right)$$

K=Correlation block number or index
C=Auto-correlation
P=Signal energy (energy of the received OFDM signal or symbol)
A=Noramlized Autocorrelation
Rising-edge is a point where the second moving average crosses the pre-defined threshold. The distance between two such rising edges is an indicator of MODE+GI of the OFDM system.

Figure 4A:
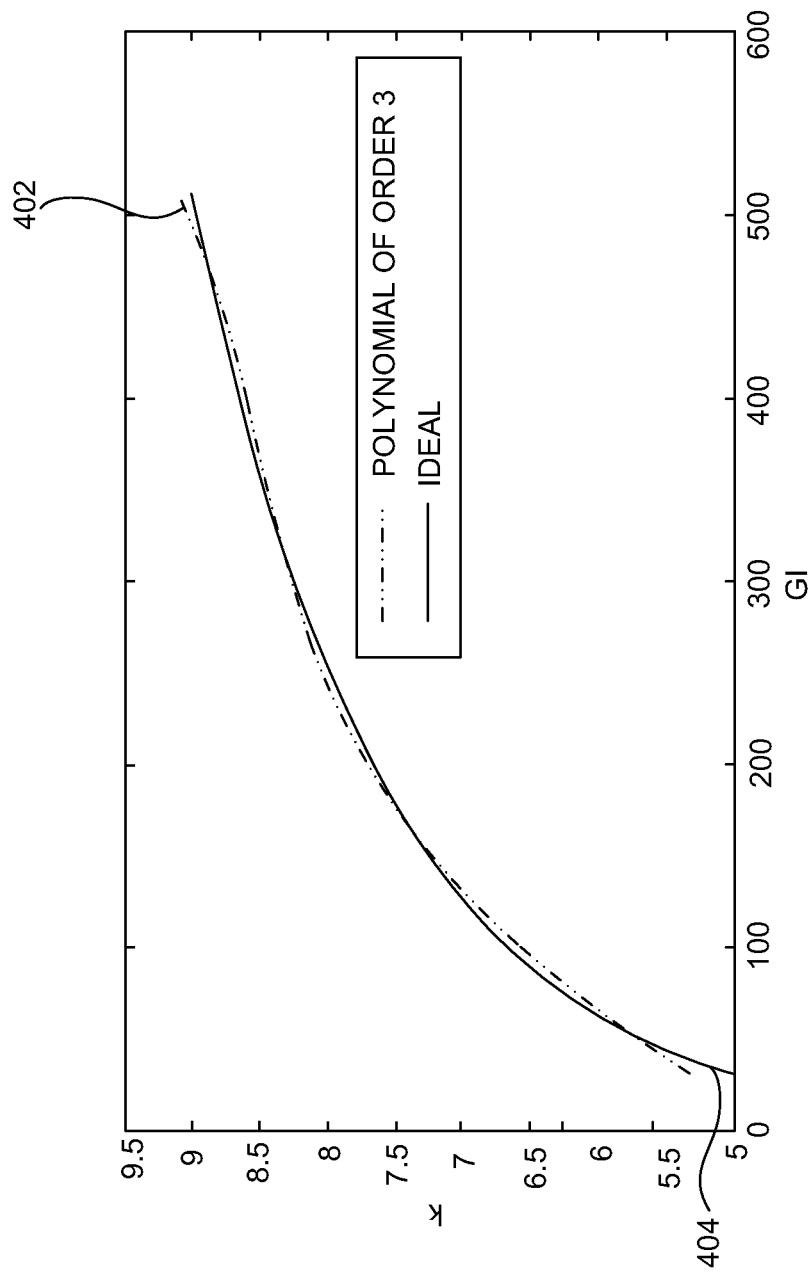
FIG. 4A is a graphical representation illustrating a $3^{rd}$ order polynomial approximation for the maximum guard interval of 512 according to an embodiment herein.
Figure 4B:
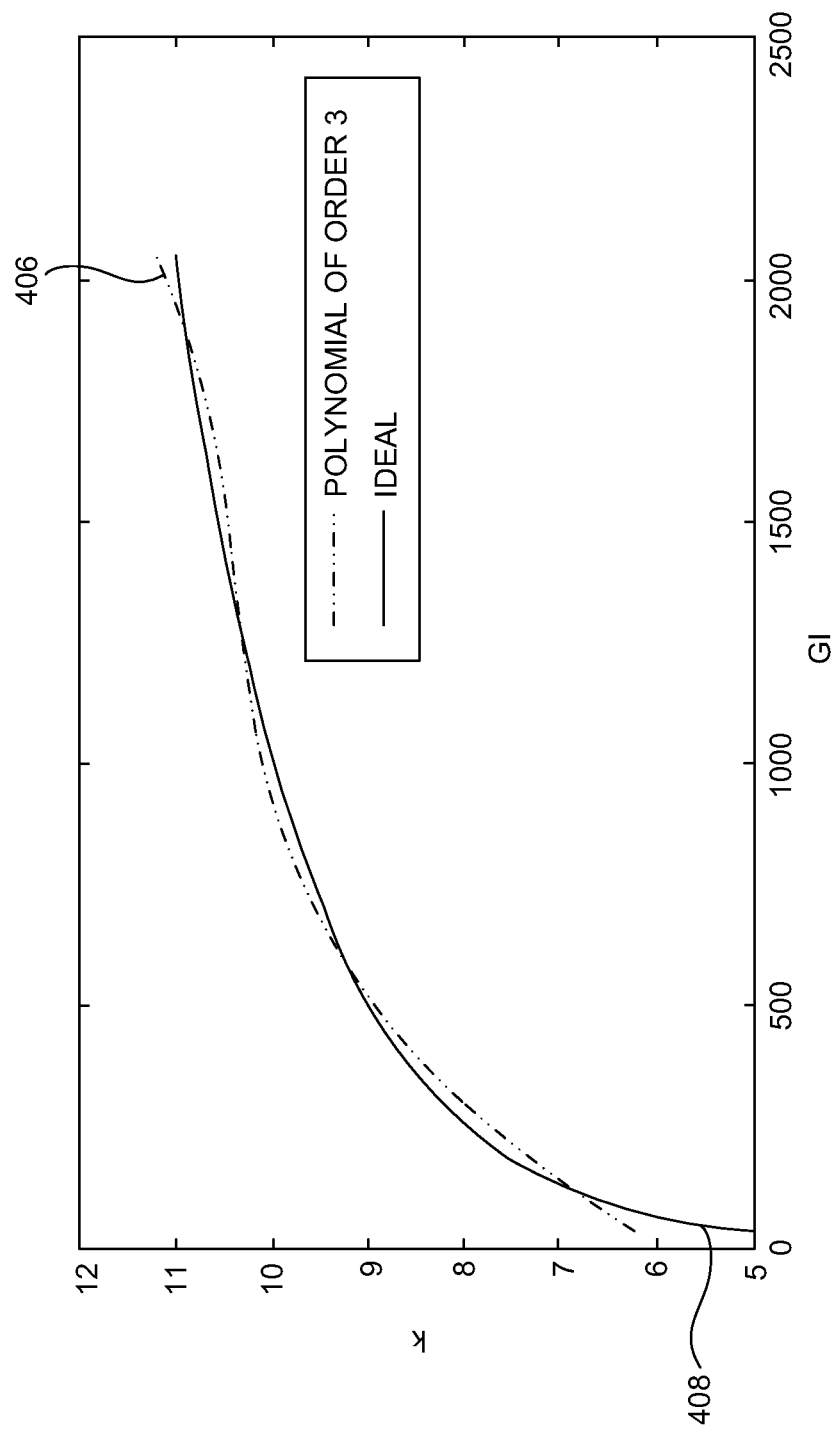
FIG. 4B is a graphical representation illustrating a $3^{rd}$ order polynomial approximation for the maximum guard interval of 2048 according to an embodiment herein.

FIGS. 4A and 4B are graphical representations illustrating a $3^{rd}$ order polynomial approximation for the maximum guard interval of 512 and 2048 according to an embodiment herein. The graphical representations of FIG. 4A and FIG. 4B include graphs (i) a $3^{rd}$ order polynomial estimation of guard interval of 512 (Max GI=512) 402, (ii) an ideal curve for guard interval of 512 (Max GI=512) 404, (iii) a $3^{rd}$ order polynomial estimation of guard interval of 2048 (Max GI=2048) 406, and (iv) an ideal curve for guard interval of 2048 (Max GI=2048) 408. The graphs can be drawn by taking guard interval (GI) on X-axis and the reading of K on Y-axis. For ideal curves, $L=\log_2(GI)$.

In particular, FIG. 4A is the graphical representation of the comparison of $3^{rd}$ order polynomial approximation for the maximum guard interval of 512 (Max GI=512) with an ideal curve of guard interval of 512. Similarly, FIG. 4B is the graphical representation of the comparison of $3^{rd}$ order polynomial approximation for the maximum guard interval of 2048 (Max GI=2048) with an ideal curve of guard interval of 512. It also shows the $3^{rd}$ order polynomial approximations for the higher guard intervals lengths seem to deviate a lot from the ideal curve.

Figure 5:
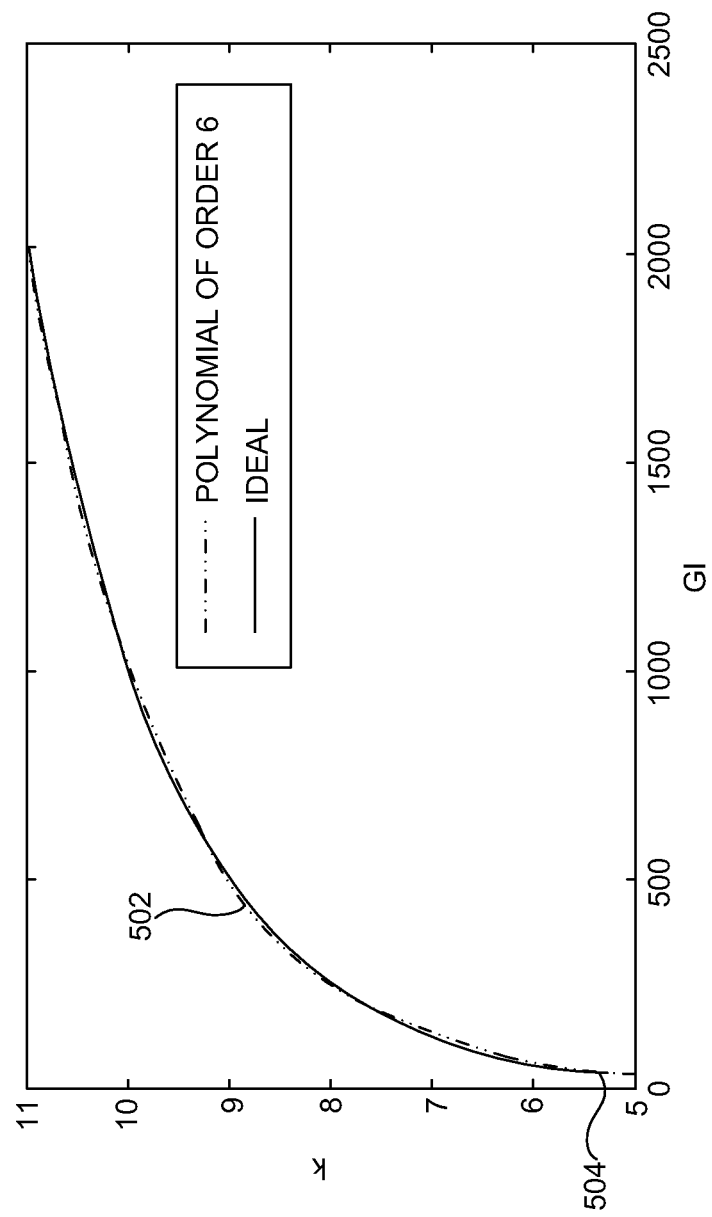
FIG. 5 is a graphical representation illustrating a $6^{th}$ order polynomial approximation for higher guard intervals according to an embodiment herein.

FIG. 5 is a graphical representation illustrating a $6^{th}$ order polynomial approximation for higher guard intervals according to an embodiment herein. It includes two graphs showing $6^{th}$ order polynomial estimation of higher guard interval 502 and an ideal curve for higher guard interval 504. The graphs can be drawn by taking guard interval (GI) on X-axis and the reading of K on Y-axis. The comparison of $6^{th}$ order polynomial approximation for the higher guard interval with an ideal curve shows the minimum of 6th order polynomial seems to closely match the ideal curve in case of higher guard intervals. Hence, the higher order polynomials are required to support higher guard intervals in the polynomial based quantization scheme.

Figure 6:
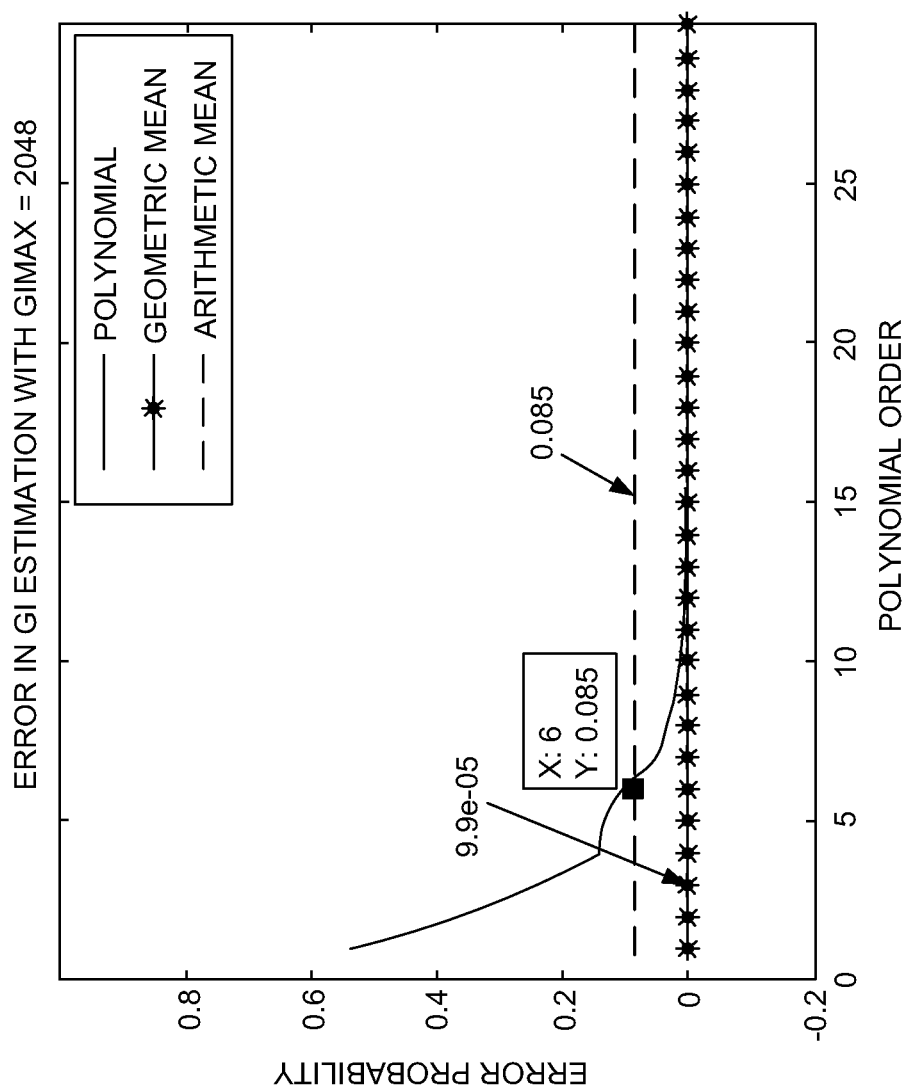
FIG. 6 is a graphical representation illustrating the comparison of polynomial based quantization, geometric mean based quantization, with the arithmetic mean according to an embodiment herein.

FIG. 6 is a graphical representation illustrating the comparison of polynomial based quantization, geometric mean based quantization, with the arithmetic mean according to an embodiment herein. FIG. 6 indicates 3 plots such as (i) a polynomial based quantization graph 602, (ii) a geometric mean quantization 604, and (iii) an arithmetic mean 606. It shows the performance comparison of nth order polynomial quantization 602, the geometric mean quantization 604, with the arithmetic mean 606 based quantization of Guard intervals. As shown in the graph, the arithmetic mean quantization for the GI length-detection has a much higher error probability compared to using the Geometric mean for quantization. The graph also indicates that the minimum polynomial order of 6 is required to perform better than the arithmetic mean based (LINEAR) quantization in case of 2048 GI. For a Guard Interval (GI) of 512, the minimum polynomial order of 3 is required to perform better than the arithmetic mean based (LINEAR) quantization.

In one embodiment, the linear quantization may be obtained by taking a log 2 of the guard interval possibilities and guard interval estimation obtained from autocorrelation. Guard interval detection is performed by linearly quantizing of the log 2 of the obtained estimate and quantizing it to the log 2 of guard interval possibilities. This scheme requires the implementation of log which is computationally complex. In another embodiment, this scheme has implemented in OFDM based systems like DVB-T and ISDB-T. This scheme provides a robust detection of guard intervals under adverse conditions.

Figure 7:
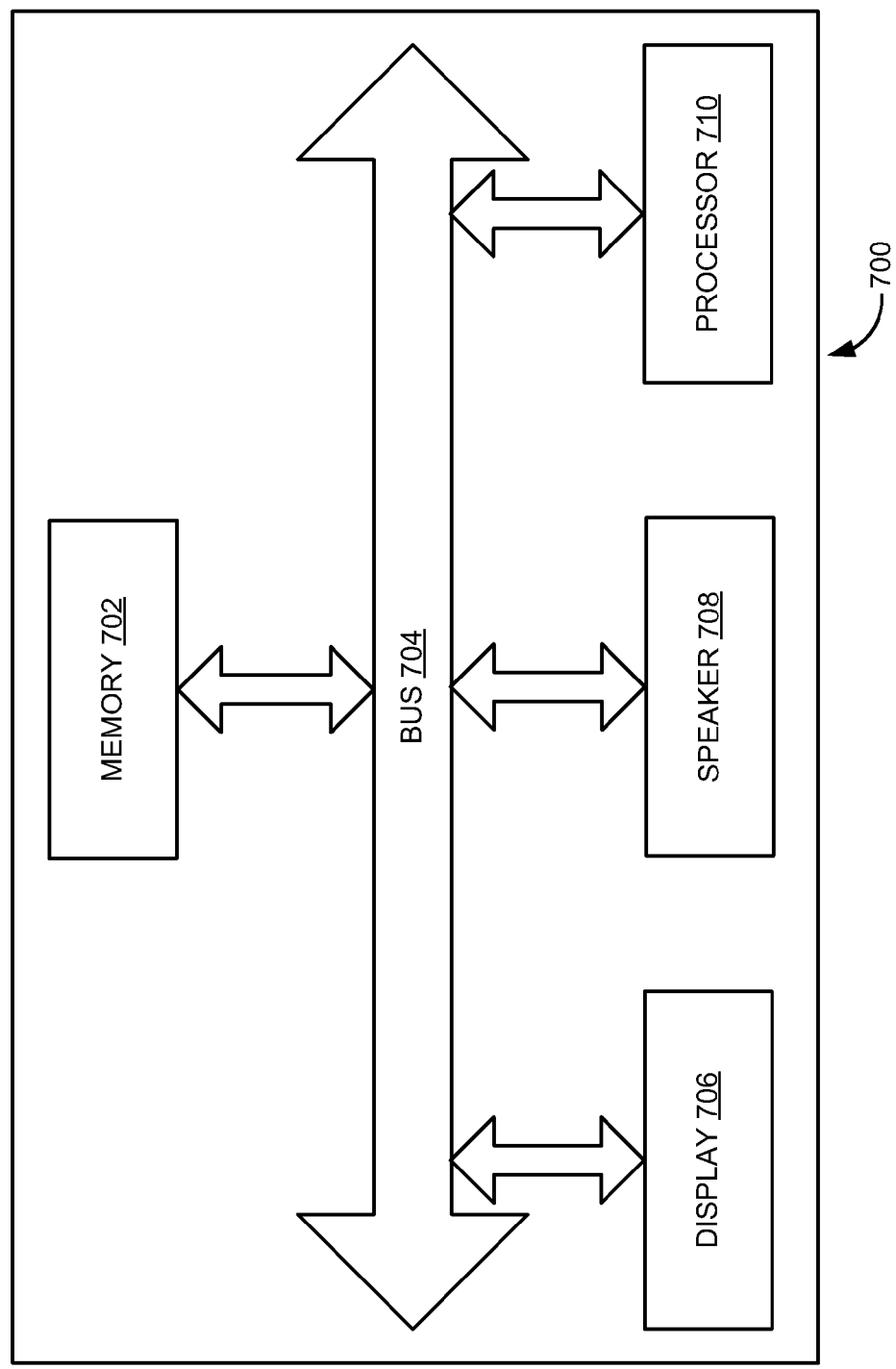
FIG. 7 illustrates an exploded view of a receiver according to an embodiment herein.

FIG. 7 illustrates an exploded view of a receiver 700 having an a memory 702 having a set of computer instructions, a bus 704, a display 706, a speaker 708, and a processor 710 capable of processing the set of computer instructions to perform any one or more of the methodologies herein, according to an embodiment herein. The processor 710 may also enable digital content to be consumed in the form of video for output via one or more displays 706 or audio for output via speaker and/or earphones 708. The processor 710 may also carry out the methods described herein and in accordance with the embodiments herein. Digital content may also be stored in the memory 702 for future processing or consumption. The memory 702 may also store program specific information and/or service information (PSI/SI), including information about digital content (e.g., the detected information bits) available in the future or stored from the past.

A user of the receiver 700 may view this stored information on display 706 and select an item for viewing, listening, or other uses via input, which may take the form of keypad, scroll, or other input device(s) or combinations thereof. When digital content is selected, the processor 710 may pass information. The content and PSI/SI may be passed among functions within the receiver 700 using bus 704.

Figure 8:
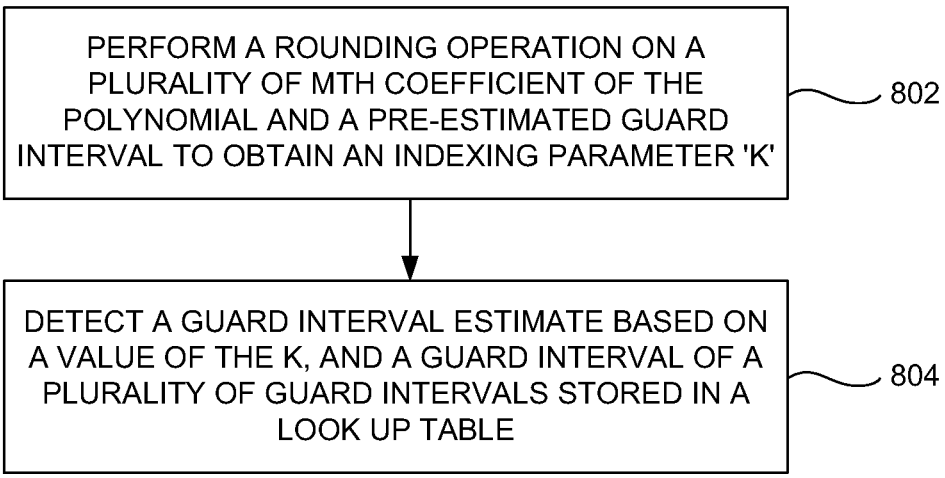
FIG. 8 is a flow diagram illustrating a method of detecting a guard interval estimate by performing a Nth order polynomial based non-linear quantization on a pre-estimated guard interval in a received Orthogonal Frequency Division Multiplexing (OFDM) signal in the receiver of FIG. 7 according to an embodiment herein.

FIG. 8 is a flow diagram illustrating a method of detecting a guard interval estimate by performing a Nth order polynomial based non-linear quantization on a pre-estimated guard interval in a received Orthogonal Frequency Division Multiplexing (OFDM) signal in the receiver 700 of FIG. 7 according to an embodiment herein. The pre-estimated guard interval is obtained by performing normalized auto-correlation on the received OFDM signal as shown in FIG. 3B. The pre-estimated guard interval includes a plurality of mth coefficient of the polynomial (e.g., P(n), P(n−1), and P(0)). In step 802, a rounding operation is performed on the one or more $m^{th}$ coefficient of the polynomial and on the pre-estimated guard interval to obtain an indexing parameter 'k'. 'k' is calculated in accordance with an equation:

$$k=RND(P(n)\hat{L}^n+P(n-1)\hat{L}^{n-1}\ldots P(0)). \quad (8)$$

In step 804, the guard interval estimate is detecting based on (i) a value of k, and (ii) a guard interval of a plurality of guard intervals stored in the look up table. The guard interval length is detected in accordance with an equation: $\tilde{L}=L[k-4]$, where 'L' is the guard interval stored in said look up table that corresponds to the value of k.

Figure 9:
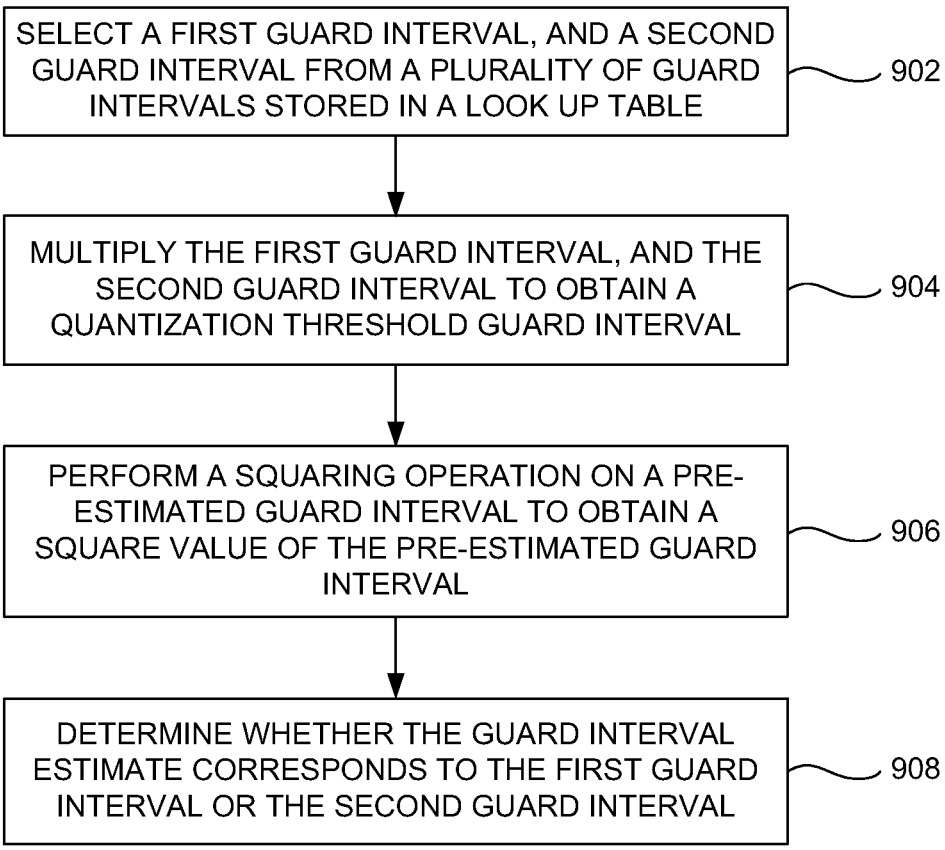
FIG. 9 is a flow diagram illustrating a method of detecting a guard interval estimate accurately by performing a Geometric Mean (GM) based non-linear quantization on a pre-estimated guard interval in a received Orthogonal Frequency Division Multiplexing (OFDM) signal in the receiver of FIG. 7 according an embodiment herein.

FIG. 9 is a flow diagram illustrating a method of detecting a guard interval estimate accurately by performing a Geometric Mean (GM) based non-linear quantization on a pre-estimated guard interval in a received Orthogonal Frequency Division Multiplexing (OFDM) signal in the receiver 700 of FIG. 7 according an embodiment herein. The pre-estimated guard interval is obtained by performing normalized auto-correlation on the received OFDM signal. In step 902, a first guard interval (e.g., the GIH), and a second guard interval (e.g., the GIL) are selected (using the GI selection module 204 of FIG. 2) from a plurality of guard intervals stored in a look up table. The Guard Interval (GI) selection module 204 selects the first guard interval and the second guard interval such that the pre-estimated guard interval lies between the first guard interval, and the second guard interval.

In step 904, the first guard interval, and the second guard interval are multiplied (using the first multiplier 210 of FIG. 2) to obtain a quantization threshold guard interval. In step 906, a squaring operation on the pre-estimated guard interval is performed (e.g., using the second multiplier 212 of FIG. 2) to obtain a square value of the pre-estimated guard interval. In one embodiment, the pre-estimated guard interval is the GI obtained from normalized auto-correlation as shown in FIG. 3B.

In step 908, it is detected whether the guard interval estimate corresponds to the first guard interval or the second guard interval. The guard interval estimate corresponds to the first guard interval when the square value of the pre-estimated guard interval is greater than the quantization threshold guard interval. The guard interval estimate corresponds to the second guard interval when the square value of the pre-estimated guard interval is less than the quantization threshold guard interval. The guard interval estimate is non-linearly quantized when the squared value of the pre-estimated guard interval is compared with a Geometric Mean (GM) of the first guard interval, and the second guard interval.

The above schemes enable detecting an accurate guard interval estimate even in the presence of echoes and a lower SNR by performing a method of a Nth order polynomial based non-linear quantization on a pre-estimated guard interval in a received Orthogonal Frequency Division Multiplexing (OFDM) signal. Further, the above schemes enable detecting a guard interval estimate accurately by performing a method of a Geometric Mean (GM) based non-linear quantization on a pre-estimated guard interval in a received Orthogonal Frequency Division Multiplexing (OFDM) signal.

These schemes further allow estimating the guard interval by obtaining a Logarithm 2 ($\log_2$) of the one or more guard intervals and the pre-estimated guard interval that is obtained from the normalized auto-correlation. The guard interval estimate may further be detected by performing linear quantization of $\log_2$ of the one or more guard intervals and the pre-estimated guard interval that obtained from the normalized auto-correlation. One of the above schemes uses a geometric progression property of the guard intervals to detect an accurate guard interval.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A wireless receiver to accurately detect a guard interval estimate in a presence of echoes and low signal-to-noise ratio (SNR) by performing a method of a Nth order polynomial based non-linear quantization on a pre-estimated guard interval in a received Orthogonal Frequency Division Multiplexing (OFDM) signal, wherein said pre-estimated guard interval is obtained by performing normalized auto-correlation on said received OFDM signal, wherein said pre-estimated guard interval comprises a plurality of mth coefficients of the polynomial, said wireless receiver comprising:
   a guard interval (GI) detector circuit that:
      performs a rounding operation on said plurality of $m^{th}$ coefficients of the polynomial and said pre-estimated guard interval to obtain an indexing parameter 'k', wherein said 'k' is calculated in accordance with an equation: $k = RND(P(n)\hat{L}^n + P(n-1)\hat{L}^{n-1} \ldots P(0))$; and
      detects said guard interval estimate based on a value of said k, and a guard interval of a plurality of guard intervals stored in a look up table, wherein said guard interval length is detected in accordance with an equation: $\hat{L} = L[k-4]$, wherein said 'L' is said guard interval stored in said look up table that corresponds to said value of said k.

2. The receiver of claim 1, wherein said value of said 'k' ranges from 5 to 11, wherein said plurality of guard intervals range from 64, 128, 256, 512, 1024, to 2048.

3. The receiver of claim 1, wherein said guard interval estimate is detected by obtaining a Logarithm 2 ($\log_2$) of said plurality of guard intervals and said pre-estimated guard interval obtained from said normalized auto-correlation.

4. The receiver of claim 3, wherein said guard interval estimate is detected by performing linear quantization of said $\log_2$, of said plurality of guard intervals and said pre-estimated guard interval obtained from said normalized auto-correlation.

5. A wireless receiver to accurately detect a guard interval estimate in a presence of echoes and low signal-to-noise ratio (SNR) by performing a method of a Geometric Mean (GM) based non-linear quantization on a pre-estimated guard interval in a received Orthogonal Frequency Division Multiplexing (OFDM) signal, wherein said pre-estimated guard interval is obtained by performing normalized auto-correlation on said received OFDM signal, said wireless receiver comprising:
   a guard interval (GI) detector circuit that comprises:
      a guard interval (GI) selection module that selects a first guard interval, and a second guard interval from a plurality of guard intervals stored in a look up table, wherein said guard interval (GI) selection module selects said first guard interval and said second guard interval such that said pre-estimated guard interval lies between said first guard interval and said second guard interval;
      a first multiplier that multiplies said first guard interval and said second guard interval to obtain a quantization threshold guard interval;
      a second multiplier that performs a squaring operation on said pre-estimated guard interval to obtain a square value of said pre-estimated guard interval;
      a comparator that receives said quantization threshold guard interval and said square value of said pre-estimated guard interval, wherein said comparator determines whether said quantization threshold guard interval is greater than said square value of said pre-estimated guard interval; and
      a multiplexer that detects said first guard interval to correspond to said guard interval estimate when said squared value of said pre-estimated guard interval is greater than said quantization threshold guard interval,
      wherein said guard interval estimate is non-linearly quantized when said squared value of said pre-estimated guard interval is compared with a Geometric Mean (GM) of said first guard interval, and said second guard interval.

6. The receiver of claim 5, wherein said multiplexer detects said second guard interval to correspond to said guard interval estimate when said square value of said pre-estimated guard interval is less than said quantization threshold guard interval.

7. The receiver of claim 5, wherein said quantization of said guard interval estimate is determined in accordance with an equation: $\hat{L} \geq \sqrt{L(n)L(n+1)}$, wherein (n) and (n+1) are adjacent indexes between which said pre-estimated guard interval lies, wherein said $\hat{L}$ is said pre-estimated guard interval, wherein ($\sqrt{L(n)L(n+1)}$) is said Geometric Mean (GM) of said first guard interval, and said second guard interval, wherein a value of said 'n' ranges from 1 to 5.

8. The receiver of claim 7, wherein an indexing parameter '[k]' equals said (n+1) when said $\hat{L}$ is greater than or equal to said Geometric Mean (GM) of said first guard interval, and said second guard interval, wherein said indexing parameter '[k]' equals said (n) when said $\hat{L}$ is less than said Geometric Mean (GM) of said first guard interval, and said second guard interval.

9. The receiver of claim 8, wherein said guard interval estimate is determined in accordance with an equation: $\tilde{L}=L[k]$, wherein a value of said 'k' ranges from 1 to 6, wherein said 'L' is said first guard interval or said second guard interval from said plurality of guard intervals stored in said look up table.

10. A method of detecting an accurate guard interval estimate in a presence of echoes and low signal-to-noise ratio (SNR) by performing an Nth order polynomial based non-linear quantization on a pre-estimated guard interval in a received Orthogonal Frequency Division Multiplexing (OFDM) signal in a receiver, wherein said pre-estimated guard interval is obtained by performing normalized auto-correlation on said received OFDM signal, wherein said pre-estimated guard interval comprises a plurality of mth coefficient of the polynomial, said method comprising:
   performing a rounding operation on said plurality of $m^{th}$ coefficient of the polynomial and said pre-estimated guard interval to obtain an indexing parameter 'k', wherein said 'k' is calculated in accordance with an equation: $k=RND(P(n)\hat{L}^n+P(n-1)\hat{L}^{n-1}\ldots P(0))$; and
   detecting said guard interval estimate based on a value of said k, and a guard interval of a plurality of guard intervals stored in a look up table, wherein said guard interval length is detected in accordance with an equation: $\tilde{L}=L[k-4]$, wherein said 'L' is said guard interval stored in said look up table that corresponds to said value of said k.

11. A method of detecting an accurate guard interval estimate in a presence of echoes and low signal-to-noise ratio (SNR) by performing a Geometric Mean (GM) based non-linear quantization on a pre-estimated guard interval in a received Orthogonal Frequency Division Multiplexing (OFDM) signal in a receiver, wherein said pre-estimated guard interval is obtained by performing normalized auto-correlation on said received OFDM signal, said method comprising:
   selecting a first guard interval, and a second guard interval from a plurality of guard intervals stored in a look up table, wherein said guard interval (GI) selection module selects said first guard interval and said second guard interval such that said pre-estimated guard interval lies between said first guard interval, and said second guard interval;
   multiplying said first guard interval and said second guard interval to obtain a quantization threshold guard interval;
   performing a squaring operation on said pre-estimated guard interval to obtain a square value of said pre-estimated guard interval; and
   determining whether said guard interval estimate corresponds to said first guard interval or said second guard interval, wherein said accurate guard interval estimate corresponds to said first guard interval when said square value of said pre-estimated guard interval is greater than said quantization threshold guard interval, wherein said accurate guard interval estimate corresponds to said second guard interval when said square value of said pre-estimated guard interval is less than said quantization threshold guard interval, wherein said guard interval estimate is non-linearly quantized when said squared value of said pre-estimated guard interval is compared with a Geometric Mean (GM) of said first guard interval and said second guard interval.

* * * * *